(12) United States Patent
Wunsche, III et al.

(10) Patent No.: US 11,511,703 B2
(45) Date of Patent: Nov. 29, 2022

(54) DRIVER PERSONALIZATION FOR VEHICLE-SHARING FLEET

(71) Applicants: DENSO International America, Inc., Southfield, MI (US); DENSO CORPORATION, Kariya (JP)

(72) Inventors: Robert Wunsche, III, Clarkston, MI (US); Mustafa Mahmoud, Northville, MI (US); Cameron Beyer, White Lake, MI (US); Thomas Newman, Livonia, MI (US)

(73) Assignees: DENSO International America, Inc., Southfield, MI (US); DENSO CORPORATION, Kariya (JP)

(*) Notice: Subject to any disclaimer, the term of this patent is extended or adjusted under 35 U.S.C. 154(b) by 512 days.

(21) Appl. No.: 16/676,873

(22) Filed: Nov. 7, 2019

(65) Prior Publication Data

US 2020/0148166 A1 May 14, 2020

Related U.S. Application Data

(60) Provisional application No. 62/812,027, filed on Feb. 28, 2019, provisional application No. 62/760,613, filed on Nov. 13, 2018.

(51) Int. Cl.
*B60R 25/20* (2013.01)
*B60R 16/037* (2006.01)
(Continued)

(52) U.S. Cl.
CPC ..... *B60R 25/2081* (2013.01); *B60H 1/00007* (2013.01); *B60H 1/00428* (2013.01); *B60R 16/037* (2013.01); *H04W 76/14* (2018.02)

(58) Field of Classification Search
CPC ............. B60R 25/2081; B60R 16/037; B60R 25/2018; B60R 25/241; B60R 25/25;
(Continued)

(56) References Cited

U.S. PATENT DOCUMENTS 5,812,067 A * 9/1998 Bergholz ............. B60R 25/252
180/257
6,400,835 B1 6/2002 Lemelson et al.
(Continued)

FOREIGN PATENT DOCUMENTS

EP 2836410 A1 * 2/2015 ........... B60R 16/037

OTHER PUBLICATIONS

International Search Report regarding International Application No. PCT/US2019/061127, dated Apr. 9, 2020.
(Continued)

*Primary Examiner* — Edwin C Holloway, III
(74) *Attorney, Agent, or Firm* — Harness, Dickey & Pierce, P.L.C.

(57) ABSTRACT

Methods and systems are disclosed and include determining, using a processor configured to execute instructions stored in a nontransitory computer-readable medium, whether a user is authenticated to operate a vehicle-sharing vehicle. The method also includes, in response to determining the user is authenticated: (i) obtaining, using the processor, a height value, wherein the height value is associated with a vehicle-sharing account of the user and is displayed on an identification card of the user; (ii) determining, using the processor, whether a position of a vehicle control mechanism needs to be adjusted based on the height value; and (iii) in response to determining that the position of the vehicle control mechanism needs to be adjusted, adjusting, using the processor, the position of the vehicle control mechanism based on the height value.

20 Claims, 13 Drawing Sheets

(51) Int. Cl.
  *B60H 1/00* (2006.01)
  *H04W 76/14* (2018.01)

(58) Field of Classification Search
  CPC ... B60R 25/252; B60R 25/255; B60R 25/257; B60R 25/305; B60R 2325/205; B60R 2325/101; B60H 1/00007; B60H 1/00428; B60H 1/00657; H04W 76/14; B60W 2040/0809; B60W 50/0098; B60W 2556/50; B60W 30/182; B60W 2540/043; G07C 2209/02
  USPC .......................................... 701/49; 340/5.72
  See application file for complete search history.

(56) References Cited

U.S. PATENT DOCUMENTS

| | | | | |
|---|---|---|---|---|
| 6,636,145 | B1* | 10/2003 | Murakami | G07B 15/00 |
| | | | | 340/5.9 |
| 11,386,678 | B2* | 7/2022 | Wunsche, III | G06Q 30/0645 |
| 2003/0204296 | A1* | 10/2003 | Galli | B60R 16/037 |
| | | | | 701/49 |
| 2009/0271609 | A1* | 10/2009 | Baskey | H04M 1/72448 |
| | | | | 713/100 |
| 2014/0278608 | A1* | 9/2014 | Johnson | B60R 25/24 |
| | | | | 705/5 |
| 2014/0309862 | A1 | 10/2014 | Ricci | |
| 2016/0093216 | A1* | 3/2016 | Lee | G07C 5/02 |
| | | | | 340/870.11 |
| 2016/0291854 | A1* | 10/2016 | Addati | B60W 50/08 |
| 2016/0318481 | A1* | 11/2016 | Penilla | B60L 53/665 |
| 2018/0365400 | A1* | 12/2018 | Lopez-Hinojosa | G06F 21/32 |
| 2019/0143997 | A1* | 5/2019 | Crimando | B60R 16/037 |
| | | | | 701/37 |
| 2019/0366959 | A1* | 12/2019 | Friedman | B60R 16/037 |
| 2020/0151475 | A1* | 5/2020 | Wunsche, III | G06V 20/59 |

OTHER PUBLICATIONS

Written Opinion regarding International Application No. PCT/US2019/061127, dated Apr. 9, 2020.

* cited by examiner

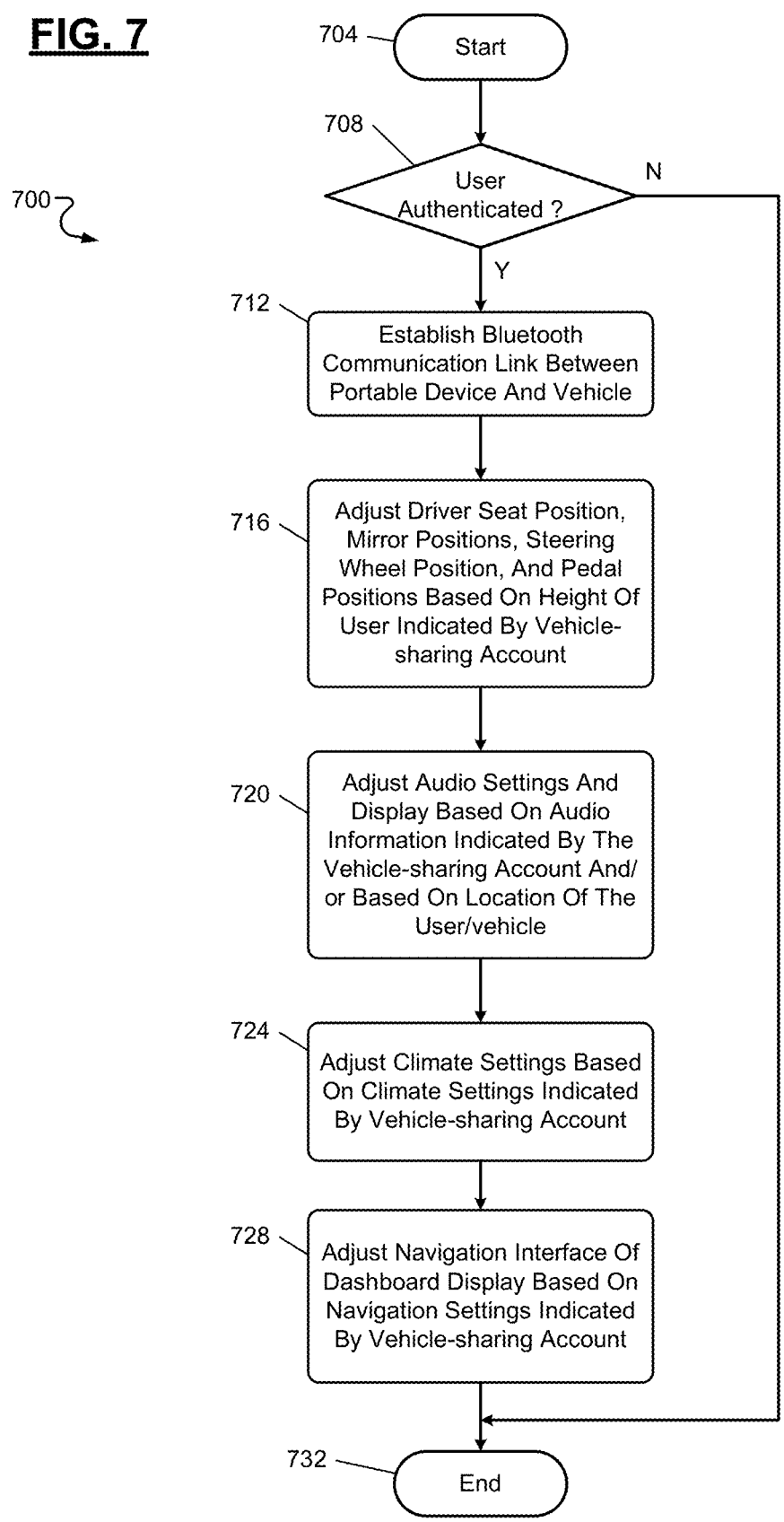

DRIVER PERSONALIZATION FOR VEHICLE-SHARING FLEET

CROSS-REFERENCE TO RELATED APPLICATIONS

This application claims the benefit of U.S. Provisional Application No. 62/760,613, filed on Nov. 13, 2018, and U.S. Provisional Application No. 62/812,027, filed on Feb. 28, 2019. The entire disclosures of each of the above applications are incorporated herein by reference.

FIELD

The present disclosure relates to methods and systems for personalizing vehicle features of a vehicle in a vehicle-sharing fleet.

BACKGROUND

This section provides background information related to the present disclosure and is not necessarily prior art.

Vehicle-sharing fleet managers may have a variety of vehicles that are available to rent for a predefined period of time, such as an hour, using a vehicle-sharing application. Similarly, ride-hailing and ride-sharing fleet managers may have a variety of vehicles that enable users to request a vehicle in order to travel to a specified destination. However, these vehicles lack sufficient and effective driver authentication and personalization systems.

SUMMARY

This section provides a general summary of the disclosure, and this section is not a comprehensive disclosure of its full scope or all of its features.

A method is disclosed and includes determining, using a processor configured to execute instructions stored in a nontransitory computer-readable medium, whether a user is authenticated to operate a vehicle-sharing vehicle. In response to determining the user is authenticated, the method includes: obtaining, using the processor, a height value, wherein the height value is associated with a vehicle-sharing account of the user and is displayed on an identification card of the user; determining, using the processor, whether a position of a vehicle control mechanism needs to be adjusted based on the height value; and in response to determining that the position of the vehicle control mechanism needs to be adjusted, adjusting, using the processor, the position of the vehicle control mechanism based on the height value.

In some embodiments, the vehicle control mechanism includes at least one of a steering wheel, an accelerator pedal, a brake pedal, a driver seat, and a mirror.

In some embodiments, the method further comprises, in response to determining the user is authenticated: obtaining, using the processor, audio settings associated with the vehicle-sharing account; and displaying, using a display device of the vehicle, graphical user interface elements based on the audio settings, wherein each of the graphical user interface elements is associated with a radio station.

In some embodiments, the method further comprises adjusting, using the processor, a volume of a radio system based on the audio settings.

In some embodiments, the method further comprises adjusting the graphical user interface elements based on a location of the vehicle.

In some embodiments, each of the graphical user interface elements is associated with a preselected radio station designated by the user.

In some embodiments, the method further comprises, in response to determining the user is authenticated: obtaining, using the processor, climate settings associated with the vehicle-sharing account; and adjusting, using the processor, at least one of (i) a temperature of a climate control system based on the climate settings, and (ii) a fan speed of a climate control system based on the climate settings.

In some embodiments, the method further comprises, in response to determining the user is authenticated: obtaining, using the processor, navigation settings associated with the vehicle-sharing account; and displaying, using a display device of the vehicle, graphical user interface elements based on the navigation settings, wherein each of the graphical user interface elements is associated with a destination.

In some embodiments, a first graphical user element is associated with a home location of the user; and a second graphical user element is associated with a desired destination.

In some embodiments, the method further comprises, in response to determining the user is authenticated, establishing a Bluetooth communication link between a portable device of the user and the vehicle.

A system is also disclosed and includes a processor configured to execute instructions stored in a nontransitory computer-readable medium. The instructions include determining whether a user is authenticated to operate a vehicle-sharing vehicle. In response to determining the user is authenticated, the instructions include: obtaining a height value, wherein the height value is associated with a vehicle-sharing account of the user and is displayed on an identification card of the user; determining whether a position of a vehicle control mechanism needs to be adjusted based on the height value; and in response to determining that the position of the vehicle control mechanism needs to be adjusted, adjusting the position of the vehicle control mechanism based on the height value.

In some embodiments, the vehicle control mechanism includes at least one of a steering wheel, an accelerator pedal, a brake pedal, a driver seat, and a mirror.

In some embodiments, the instructions further comprise, in response to determining the user is authenticated: obtaining audio settings associated with the vehicle-sharing account; and displaying graphical user interface elements based on the audio settings, wherein each of the graphical user interface elements is associated with a radio station.

In some embodiments, the instructions further comprise adjusting a volume of a radio system based on the audio settings.

In some embodiments, the instructions further comprise adjusting the graphical user interface elements based on a location of the vehicle.

In some embodiments, each of the graphical user interface elements is associated with a preselected radio station designated by the user.

In some embodiments, the instructions further comprise, in response to determining the user is authenticated: obtaining climate settings associated with the vehicle-sharing account; and adjusting at least one of (i) a temperature of a climate control system based on the climate settings, and (ii) a fan speed of a climate control system based on the climate settings.

In some embodiments, the instructions further comprise, in response to determining the user is authenticated: obtaining navigation settings associated with the vehicle-sharing account; and displaying graphical user interface elements based on the navigation settings, wherein each of the graphical user interface elements is associated with a destination.

In some embodiments, a first graphical user element is associated with a home location of the user; and a second graphical user element is associated with a desired destination.

In some embodiments, the instructions further comprise, in response to determining the user is authenticated, establishing a Bluetooth communication link between a portable device of the user and the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and the drawings are not intended to limit the scope of the present disclosure.

FIGS. 6-7 illustrate example control algorithms according to the present disclosure.

Corresponding reference numerals indicate corresponding parts throughout the several views of the drawings.

DETAILED DESCRIPTION

Figure 1:
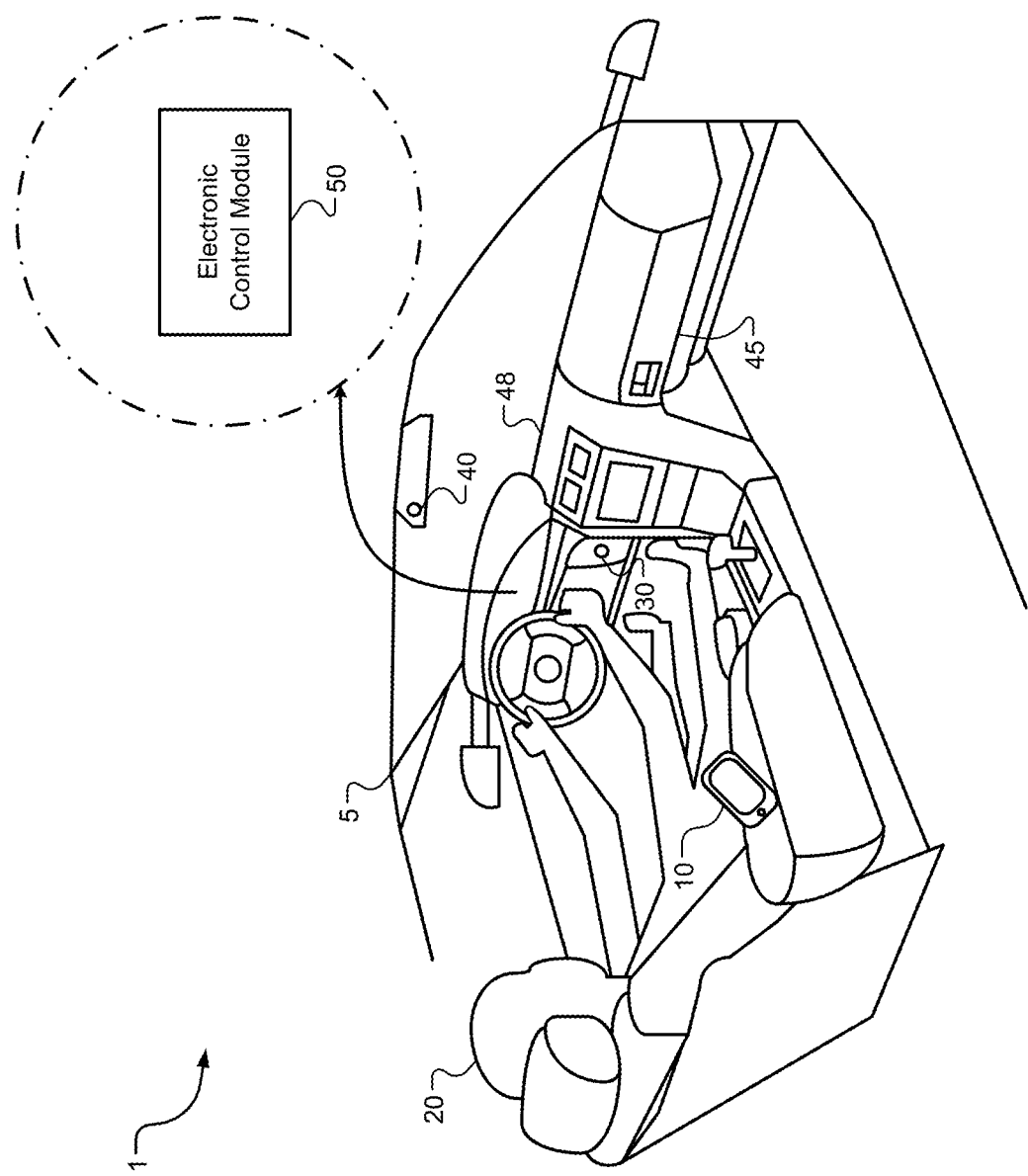
FIGS. 1-4 are example diagrams of a vehicle according to the present disclosure.

Example embodiments will now be described more fully with reference to the accompanying drawings.

With reference to FIGS. 1-4, example illustrations of a system 1 are shown. The system 1 may include a vehicle 5, a portable device 10, an ignition switch 30, an interior camera 40, and a storage compartment 45. In one embodiment, the vehicle 5 is part of a vehicle-sharing fleet. Additionally or alternatively, the vehicle 5 may be part of a ride-sharing fleet and/or a ride-hailing fleet.

The vehicle 5 may include an electronic control module (ECM) 50. As an example, the ECM 50 may be located behind a dashboard 48 of the vehicle 5. While one interior camera 40 is shown in this example, any number of interior cameras 40 can be included within the vehicle 5. Moreover, while the interior camera 40 is located on a rear-view mirror in FIG. 1, the interior camera 40 may be positioned at any suitable location within the interior of the vehicle 5.

The portable device 10 may be any device that is configured to transmit and receive wireless signals, such as a smartphone, smartwatch, wearable electronic device, key fob, tablet device, laptop device, a Bluetooth-enabled device, or other device associated with a user 20 and capable of wireless communication. As described below in further detail, the portable device 10 is configured to generate vehicle-sharing requests and define personalized vehicle settings via an application executing on the portable device 10. Furthermore, the portable device 10 is configured to receive a digital key associated with the vehicle 5 from a fleet manager computing system (shown below) in response to transmitting the vehicle-sharing request. The digital key enables the user 20 to unlock and enter the vehicle 5. Accordingly, the portable device 10 may include at least one processor that is configured to execute instructions stored in a nontransitory computer-readable medium, such as a random-access memory (RAM) and/or a read-only memory (ROM).

The interior camera 40 may be configured to obtain facial feature data of the user 20, such as a face and head of the user 20. Based on the facial feature data, the ECM 50 is configured to, for example, execute a driver authentication algorithm, as described below in further detail with reference to FIG. 6. In order to carry out the functionality of algorithms described herein, the ECM 50 may include at least one processor that is configured to execute instructions stored in a nontransitory computer-readable medium, such as RAM and/or ROM. The ECM 50 may be in communication with the interior camera 40 via a hardware link, such as a local interconnect network (LIN) cable, a controller area network (CAN) cable, an Ethernet cable, or any other suitable hardwire link. In other embodiments, the ECM 50 may be in communication with the interior camera 40 via any suitable telemetric link, such as a Bluetooth link (e.g., Bluetooth low-energy), a Wi-Fi or Wi-Fi direct link, a cellular link, etc. Likewise, the ECM 50 may be in communication with the portable device 10 via any suitable telemetric link, such as a Bluetooth link (e.g., Bluetooth low-energy), a Wi-Fi or Wi-Fi direct link, a cellular/LTE link, etc.

In response to the ECM 50 authenticating the user 20, the ECM 50 may enable the user 20 to activate the vehicle 5. As an example, the ECM 50 may enable the user 20 to retrieve keys stored in the storage compartment 45 (e.g., glove box) of the vehicle 5 for subsequent placement and rotation of the ignition switch 30. Alternatively, the ignition switch 30 may be implemented by a button, and as such, the vehicle 5 may be activated in response to pressing the button and the portable device 10 being located within an activation range of the vehicle 5. Additionally, in response to the ECM 50 authenticating the user 20, the ECM 50 may execute a driver personalization algorithm, as described below in further detail with reference to FIG. 7.

Figure 2:
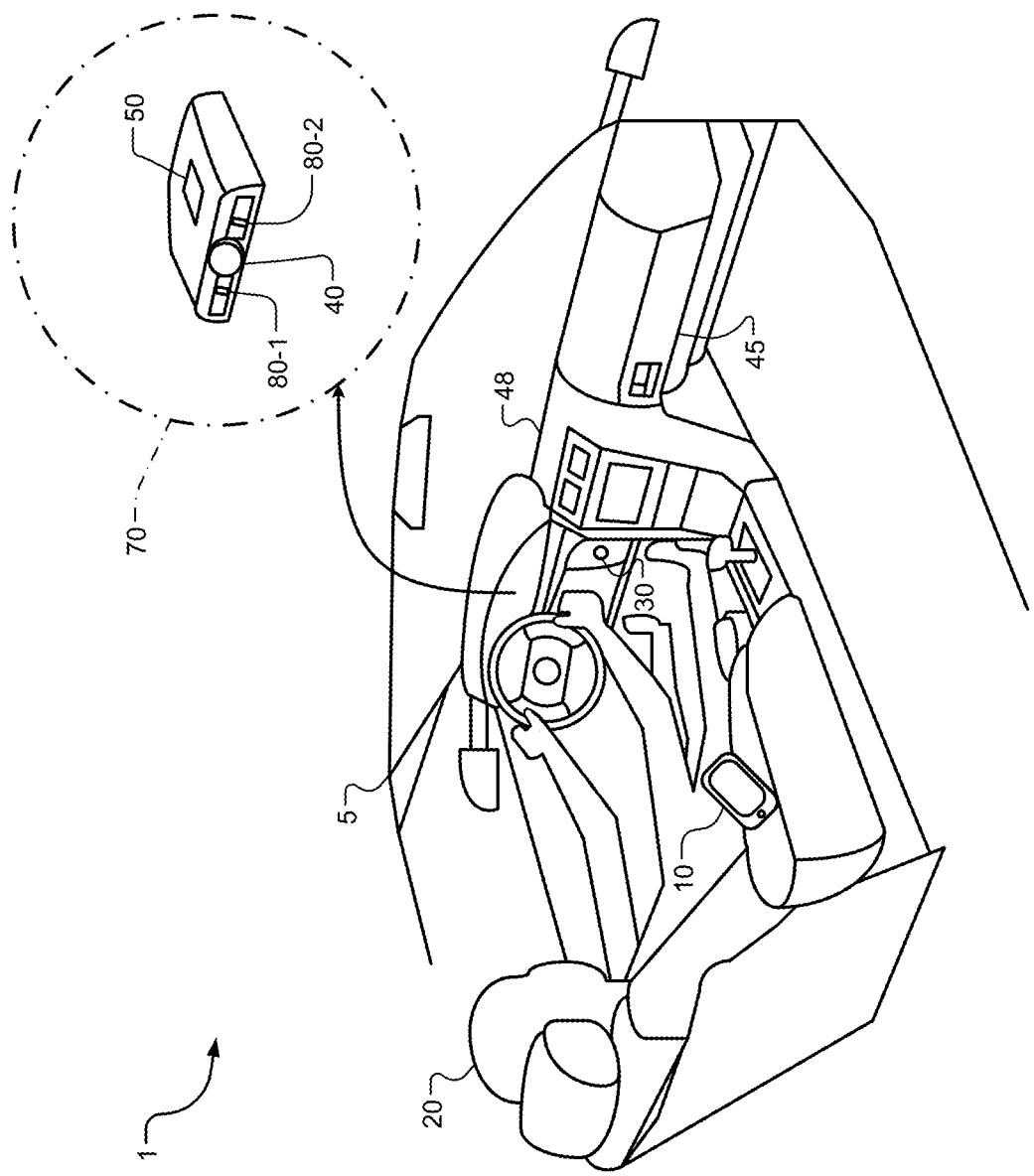

In other embodiments and as shown in FIG. 2, the dashboard 48 may also include a driver status monitor (DSM) 70, which may be mounted over a steering column connected to the steering wheel of the vehicle 5. The DSM 70 may include infrared (IR) sensors 80-1,80-2 (collectively referred to as IR sensors 80), the interior camera 40, and the ECM 50. The DSM 70 may be configured to obtain facial feature data of the user 20. As an example, the ECM 50 may obtain facial feature data sensed by the IR sensors 80 and the interior camera 40, including images of the face and head of the user 20. Based on the facial feature data, the ECM 50 is configured to, for example, execute the driver authentication algorithm by performing a variety of image processing and/or computer vision techniques for facial recognition, as understood by one of ordinary skill in the art.

While the embodiments shown in FIGS. 1-2 include one interior camera 40, in other embodiments, any number of interior cameras 40 may be included within the vehicle 5. Moreover, while the interior camera 40 is included on a rear-view mirror in FIG. 1 and the DSM 70 in FIG. 2, the interior camera 40 may be positioned at any suitable location of the interior of the vehicle 5.

Figure 3:
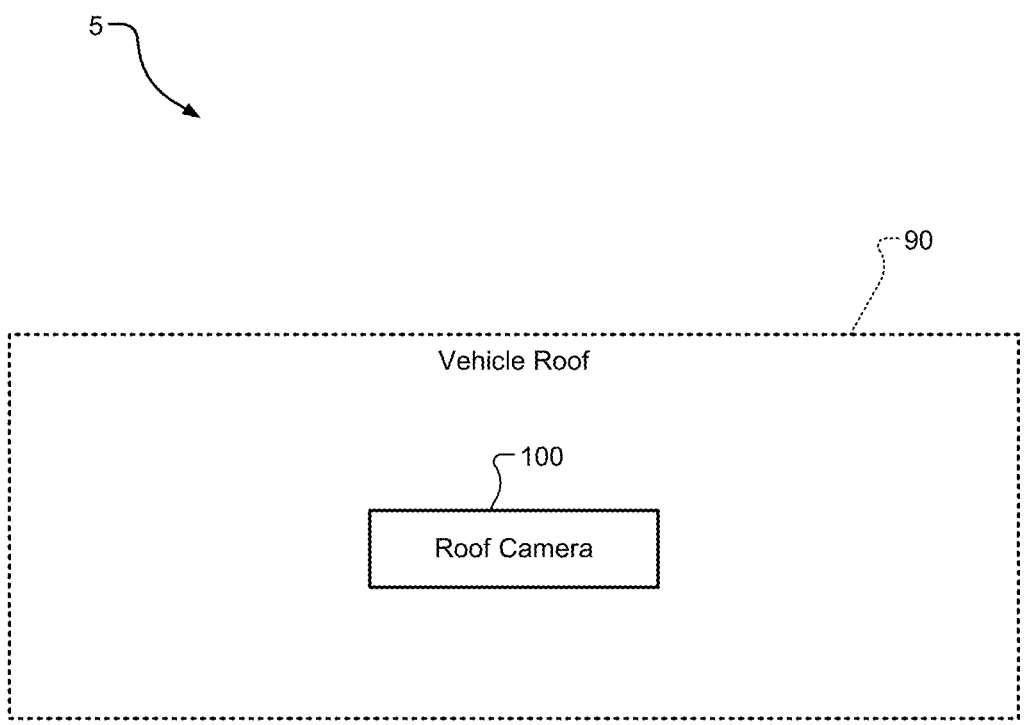

Additionally, a vehicle roof 90 (e.g., a headliner) of the vehicle 5 may include a roof camera 100, as shown in FIG. 3. While this embodiment illustrates one roof camera 100, in other embodiments, any number of roof cameras 100 may be included on the vehicle roof 90. The roof camera 100 is configured to obtain image data representing the interior of the vehicle 5. The ECM 50 may be in communication with the roof camera 100 via a hardware link, such as a LIN cable, an Ethernet cable, or any other suitable hardwire link. In other embodiments, the ECM 50 may be in communication with the roof camera 100 via any suitable telemetric link, such as a Bluetooth link (e.g., Bluetooth low-energy), a Wi-Fi or Wi-Fi direct link, a cellular link, etc.

Figure 4:
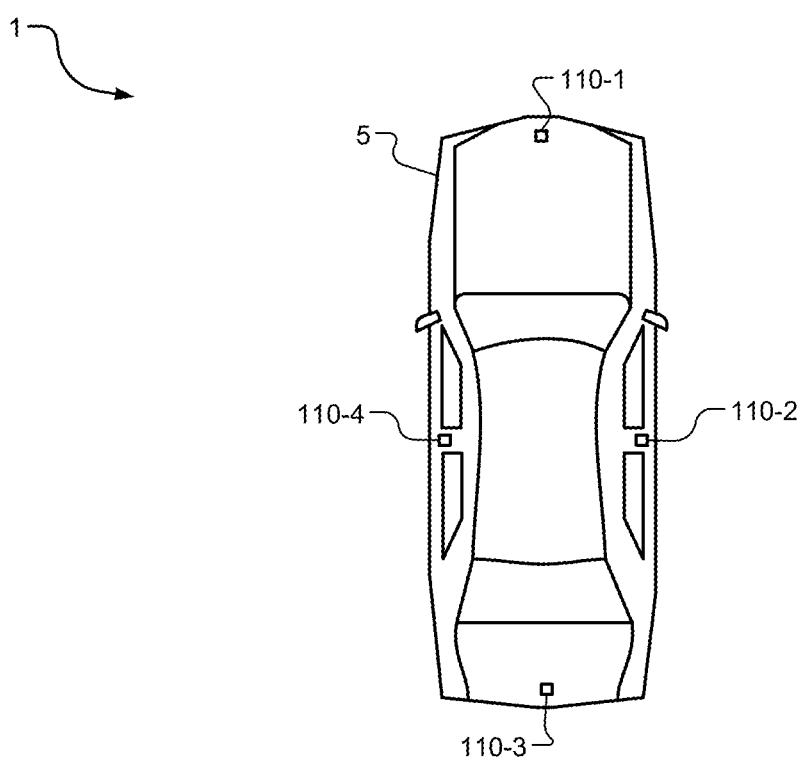

Additionally, the vehicle 5 may include a plurality of exterior cameras 110-1, 110-2, 110-3, 110-4 (collectively referred to as exterior cameras 110), as shown in FIG. 4. While this embodiment illustrates four exterior cameras 110, in other embodiments, the vehicle 5 may include any number of exterior cameras 110, and the exterior cameras 110 may be located at any suitable location on an exterior of the vehicle 5. Based on image data obtained by the exterior cameras 110, the ECM 50 may be configured to execute the driver authentication algorithm, as described below in further detail with reference to FIG. 6. The ECM 50 may be in communication with the exterior cameras 110 via a hardware link, such as a LIN cable, a CAN cable, an Ethernet cable, or any other suitable hardwire link. In other embodiments, the ECM 50 may be in communication with the exterior cameras 110 via any suitable telemetric link, such as a Bluetooth link (e.g., Bluetooth low-energy), a Wi-Fi or Wi-Fi direct link, a cellular link, etc.

Figure 5A:
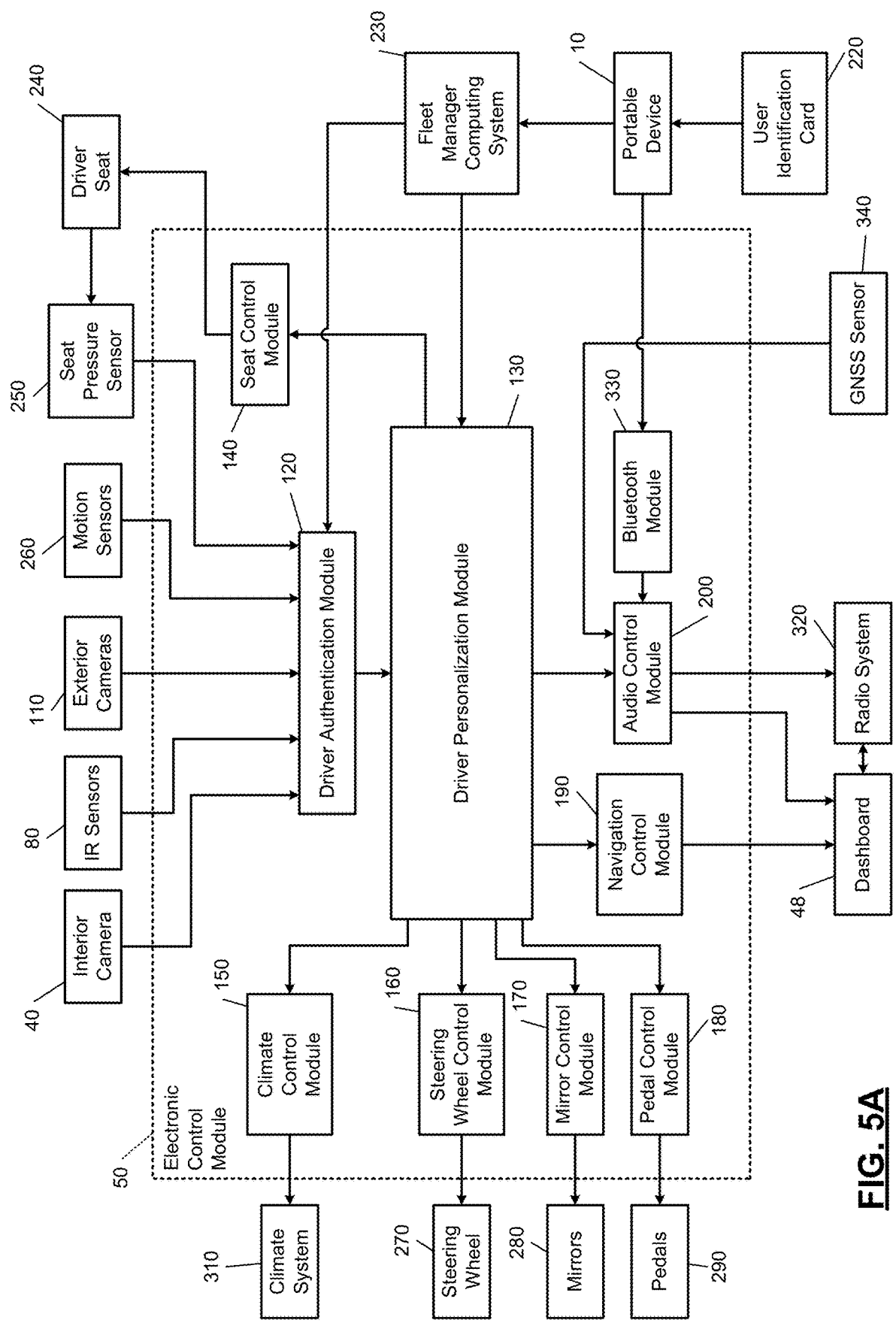
FIGS. 5A-5G illustrate a detailed example functional block diagram of an electronic control module of the vehicle according to the present disclosure.
Figure 5B:
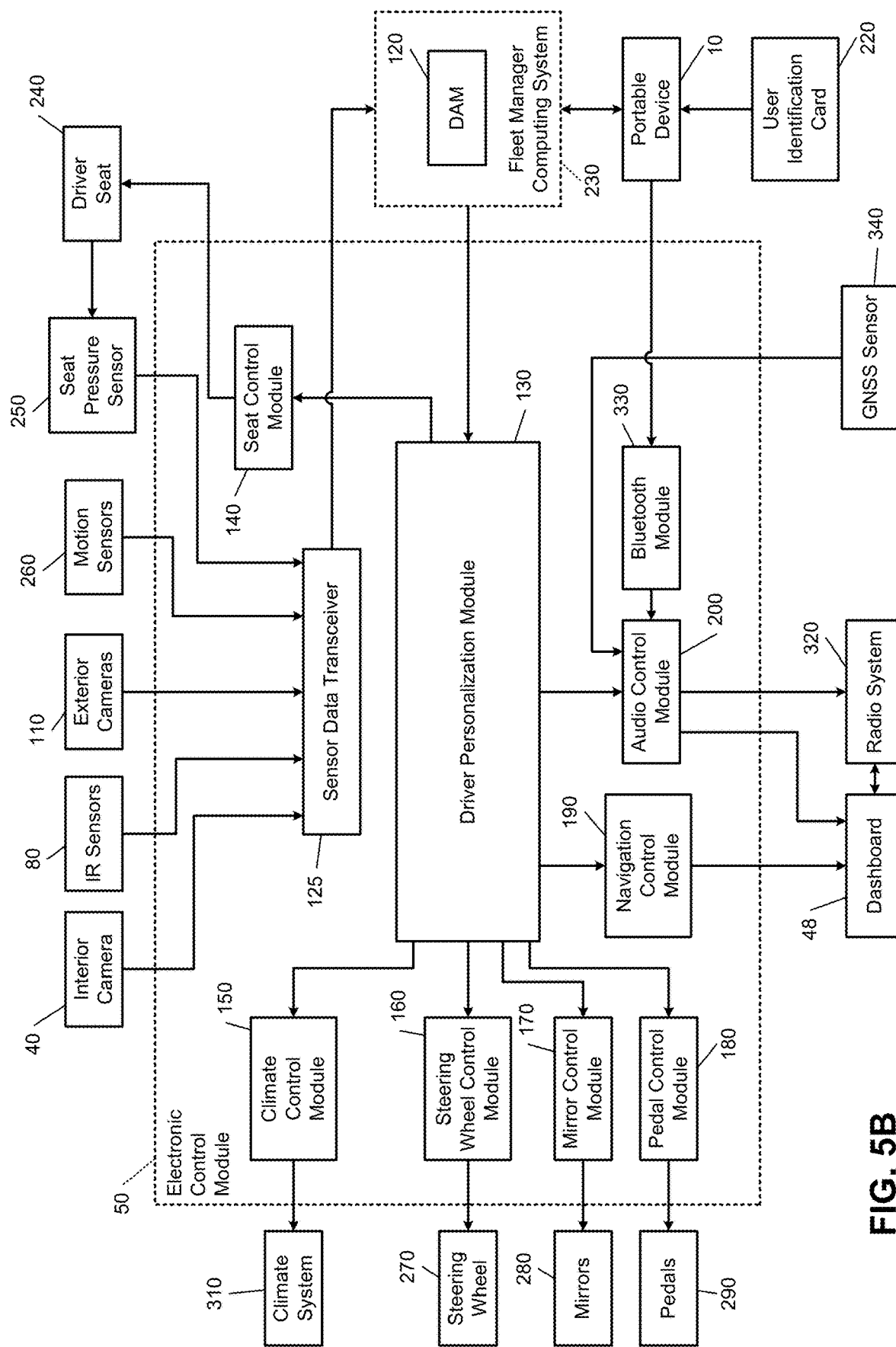

With reference to FIG. 5A, a detailed illustration of the ECM 50 is shown. The ECM 50 may include a driver authentication module (DAM) 120, a driver personalization module (DPM) 130, a seat control module 140, a climate control module 150, a steering wheel control module 160, a mirror control module 170, a pedal control module 180, a navigation control module 190, and an audio control module 200. The modules of the ECM 50 may be implemented by one or more processors that are configured to execute instructions stored in a nontransitory computer-readable medium, such as a RAM and/or ROM. In other embodiments, the DAM 120 may be included as part of a fleet manager computing system 230 that is configured to receive data from the interior camera 40, the IR sensors 80, the roof camera 100, the exterior cameras 110, a seat pressure sensor 250, and motion sensors 260 via a sensor data transceiver 125 of the ECM 50, as shown in FIG. 5B. Additionally or alternatively, the DPM 130 may be included as part of the fleet manager computing system 230. In order to carry out the functionality described herein, the fleet manager computing system 230 may include one or more processors that are configured to execute instructions stored in a nontransitory computer-readable medium, such as a RAM and/or ROM.

Figure 5C:
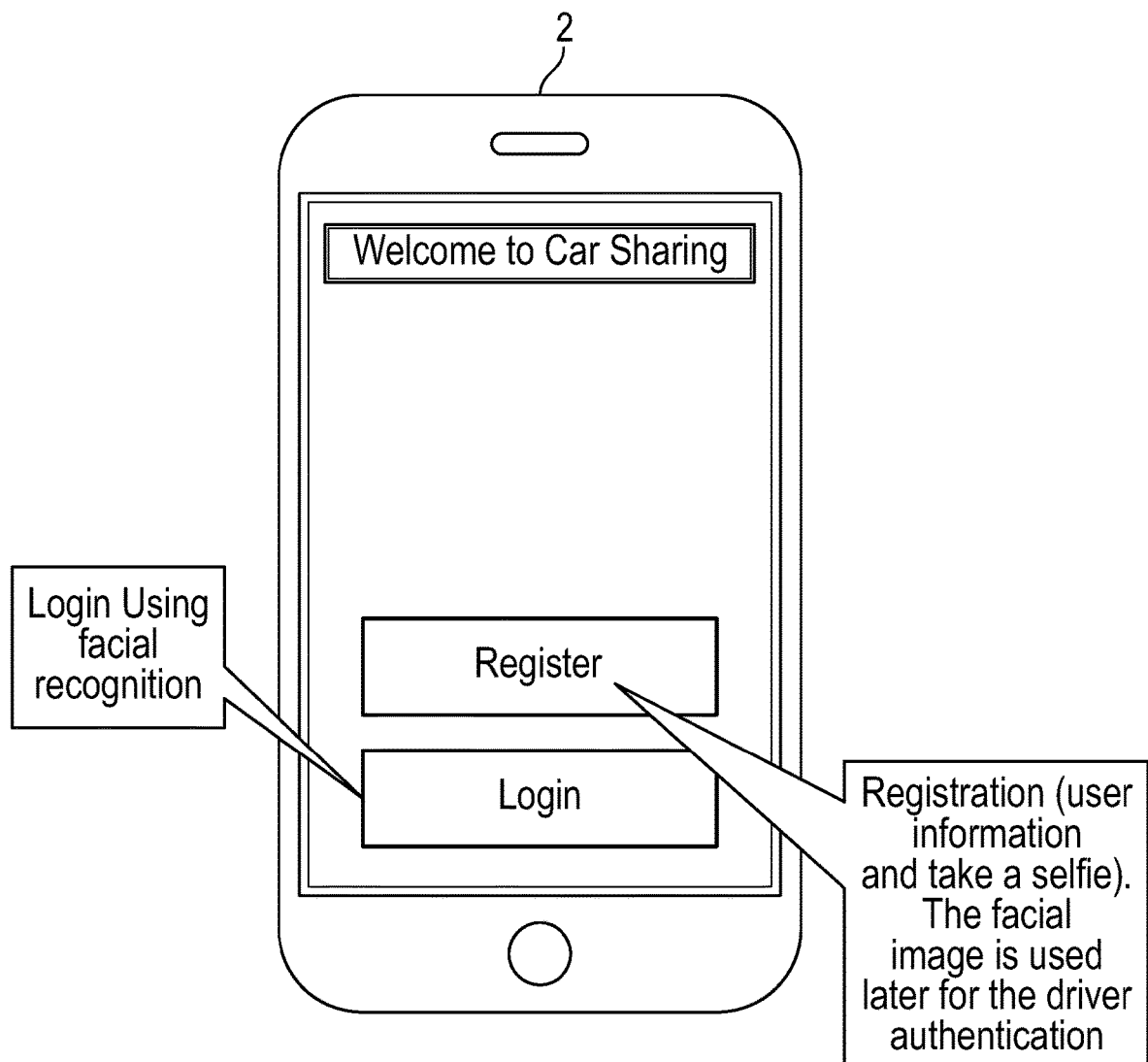

In one embodiment, the user 20 may initially be required to create a vehicle-sharing account in order to access the vehicle-sharing service, as shown in screenshot 2 in FIG. 5C. As an example, the user 20 may be instructed to capture, using a camera of the portable device 10, an image of a user identification card 220 associated with the user 20 (e.g., a driving license). Subsequently, the portable device 10 and/or the fleet manager computing system 230 may extract various identifying characteristics associated with the user 20 (e.g., height, weight, eye color, age, operating restrictions, license expiration date, emergency contacts, and facial feature characteristics of the user 20) from the user identification card 220. In order to extract the identifying characteristics described using text (e.g., the weight of the user 20), the portable device 10 and/or fleet manager computing system 230 may be configured to execute various optical character recognition (OCR) algorithms. In order to extract facial feature characteristics of the user 20, the portable device 10 and/or fleet manager computing system 230 may include a multilayered neural network for performing facial detection, feature extraction, and/or facial identification algorithms. Accordingly, the fleet manager computing system 230 may generate the vehicle-sharing account associated with the user 20 based on the extracted identifying characteristics.

Based on the facial feature characteristics of the vehicle-sharing account associated with the user 20, The DAM 120 is configured to execute the driver authentication algorithm described below with reference to FIG. 6. In one embodiment, the DAM 120 obtains image data from the interior camera 40 and/or sensor data from the IR sensors 80 once it determines that the user 20 is sitting in a driver seat 240. As an example, the DAM 120 may determine the user 20 is sitting in the driver seat 240 when the seat pressure sensor 250 located underneath the driver seat 240 generates pressure data indicating that the user 20 is sitting in the driver seat 240. Once the DAM 120 obtains the image data from the interior camera 40 and/or sensor data from the IR sensors 80, the DAM 120 is configured to generate facial feature data based on the obtained image data. If, for example, the facial feature data corresponds to the facial feature characteristics of the vehicle-sharing account associated with the user 20, then the DAM 120 may authenticate the user 20 and subsequently enable the user 20 to activate the vehicle 5. Otherwise, the DAM 120 may fail to authenticate the user 20 and prevent the user 20 from activating the vehicle 5 or may perform alternative authentication algorithms.

In other embodiments, the DAM 120 may obtain image data from the exterior cameras 110. As an example, the DAM 120 may continuously obtain data from the motion sensors 260 that are configured to generate motion data representing object movement near the exterior of the vehicle 5. If the DAM 120 determines that the motion sensors 260 are generating data that corresponds to the user 20 approaching the vehicle 5, the DAM 120 may subsequently activate at least one of the exterior cameras 110 and obtain the image data of the user 20. Likewise, once the DAM 120 obtains the image data from the at least one exterior camera 110, the DAM 120 is configured to generate the facial feature data based on the obtained data. If the facial feature data corresponds to the facial feature characteristics of the vehicle-sharing account associated with the user 20, then the DAM 120 may authenticate the user 20 and subsequently enable the user 20 to activate the vehicle 5.

Additionally or alternatively, the DAM 120 may authenticate the user 20 based on other identifying characteristics of the vehicle-sharing account, such as a weight of the user 20. In one embodiment, once the DAM 120 determines that the user 20 is sitting in the driver seat 240, the seat pressure sensor 250 located underneath the driver seat 240 generates pressure data. Based on the pressure data, the DAM 120 may determine a weight of the user 20. The DAM 120 may subsequently authenticate the user 20 and enable the user 20 to activate the vehicle 5 if, for example, the determined weight corresponds to the weight of the user 20 indicated by the vehicle-sharing account. In other embodiments, the DAM 120 may authenticate the user 20 based on, for example, operating restrictions and the license expiration date associated with the vehicle-sharing account, as described below in further detail with reference to FIG. 6.

In response to the DAM 120 authenticating the user 20, the DPM 130 may adjust various settings of the vehicle 5 based on the user's vehicle-sharing account. In one embodiment, the DPM 130 may instruct the seat control module 140, the steering wheel control module 160, the mirror control module 170, and the pedal control module 180 to adjust a position of the driver seat 240, a steering wheel 270, mirrors 280 (i.e., side mirrors, rear-view mirror, etc.), and accelerator and brake pedals 290 (collectively referred to as pedals 290), respectively, based on the height of the user 20 indicated by the vehicle-sharing account. Based on the height of the user 20, the DPM 130 may (i) instruct the seat control module 140 to adjust the position of the driver seat 240 such that the user 20 can see over the dashboard 48 and reach the pedals 290; (ii) instruct the steering wheel control module 160 to adjust the position of the steering wheel 270 such that the user 20 may comfortably and safely grip and rotate the steering wheel 270; (iii) instruct the mirror control module 170 to adjust the position of the mirrors 280 such that the user 20 can see blind-spots and see behind the vehicle 5; and (iv) instruct the pedal control module 180 to adjust the position of the pedals 290 such that the user 20 can reach the pedals 290.

Figure 5D:
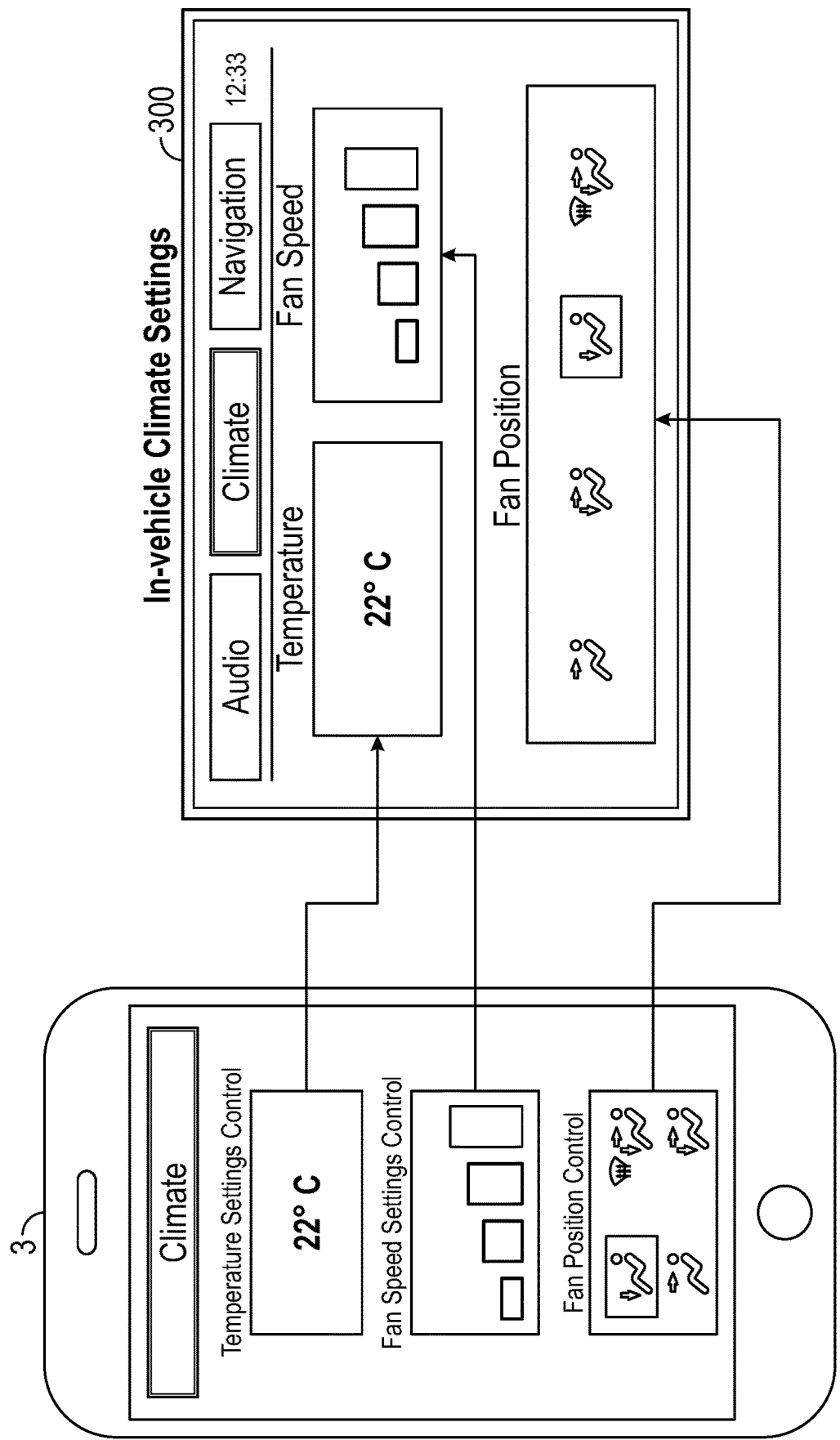
Figure 5E:
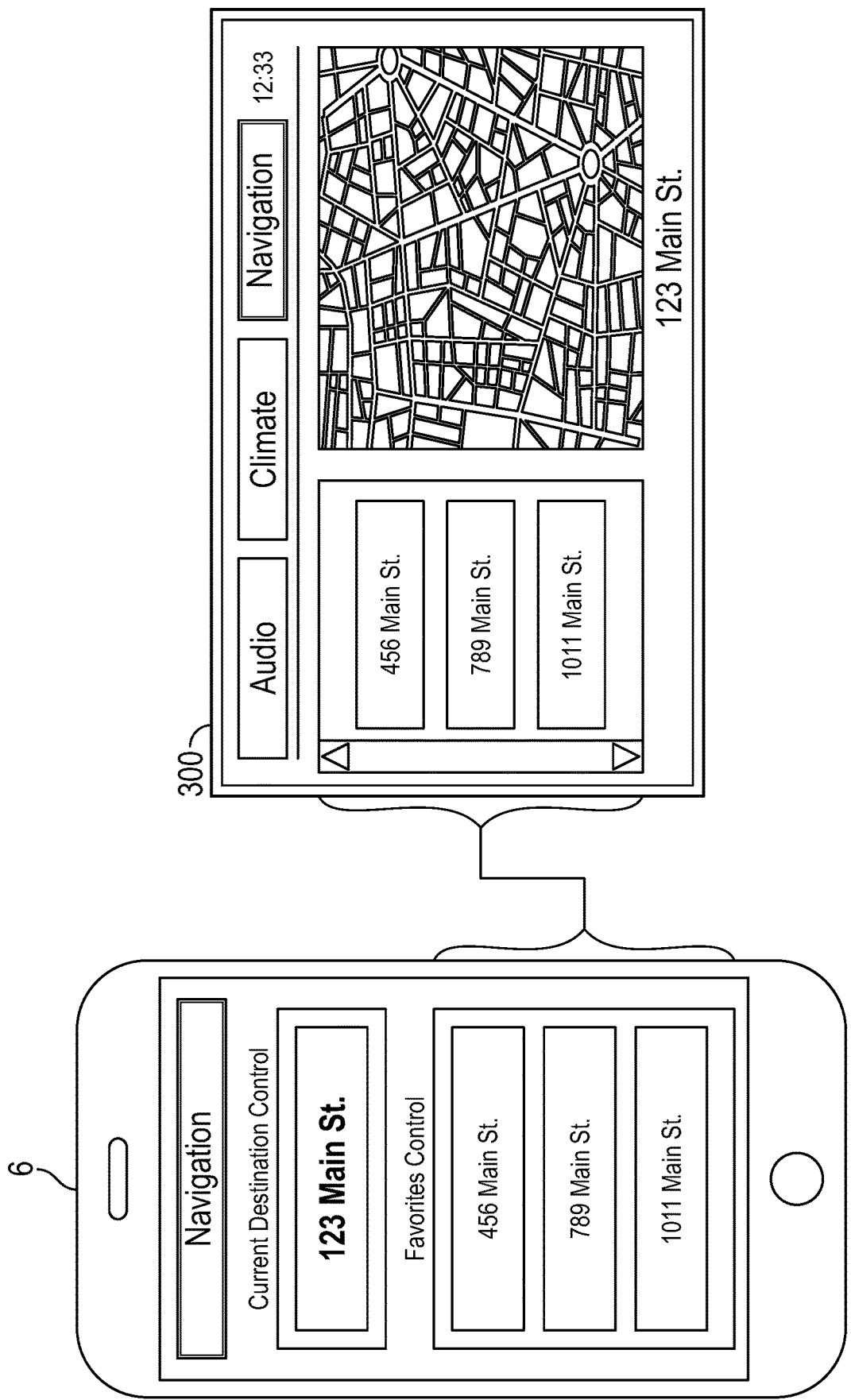

Additionally, the DPM 130 may instruct the climate control module 150 and the navigation control module 190 to adjust various climate and navigation settings of the vehicle 5 based on the user's vehicle-sharing account. The climate and navigation settings may be defined by the user 20 via an application executing on the portable device 10, as shown in screenshot 3 in FIG. 5D and screenshot 6 in FIG. 5E. Additionally, the climate and navigation settings may be defined by the user 20 via a display 300 of the dashboard 48, as shown in FIGS. 5D-5E. In other embodiments, the climate and navigation settings may be defined by the fleet manager computing system 230 using a machine learning algorithm that utilizes climate and navigation settings of prior vehicle-sharing sessions associated with the user 20 to predict the user's desired climate and navigation settings.

As an example, the DPM 130 may instruct the climate control module 150 to adjust a temperature, fan speed, and/or vent positions of climate system 310 based on the climate settings illustrated in FIG. 5D. Additionally, the DPM 130 may instruct the climate control module 150 to designate the vents of the climate system 310 in which the heated or cooled air is provided to the vehicle 5 (e.g., a foot-well vent) based on the climate settings illustrated in FIG. 5D.

Figure 5F:
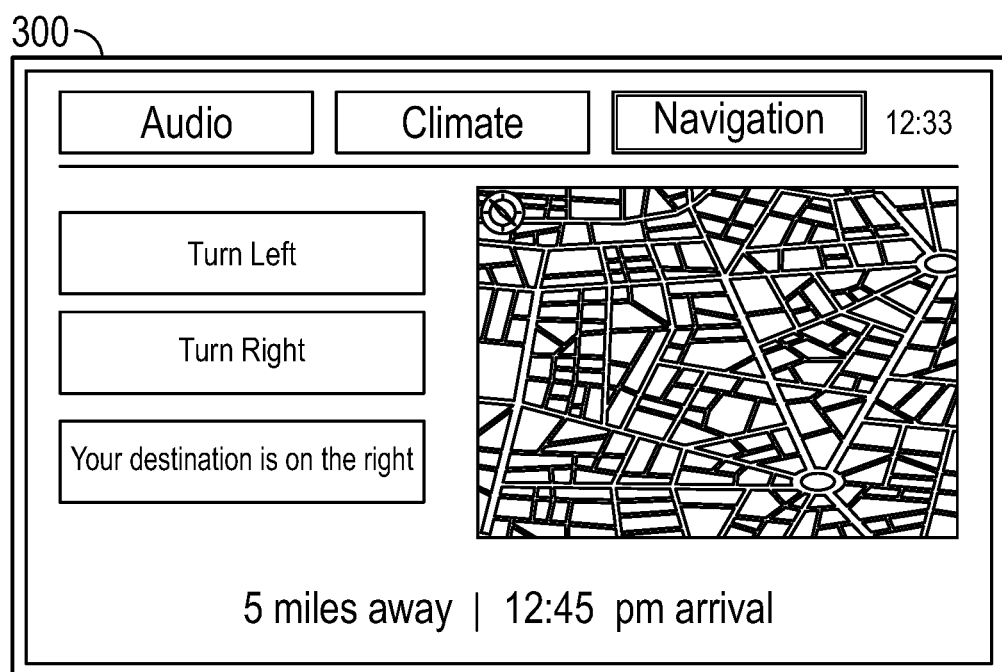

As another example, the DPM 130 may instruct the navigation control module 190 to display graphical user interface (GUI) elements on a navigation interface of the display 300 based on the navigation settings illustrated in FIG. 5E. The GUI elements may correspond to frequently visited destinations associated with the vehicle-sharing account of the user 20 and/or a mapping application of the portable device 10, a home destination associated with the vehicle-sharing account of the user 20 and/or the mapping application of the portable device 10, and a desired destination associated with the vehicle-sharing request. In response to selecting one of the GUI elements, the navigation interface of the display 300 may be configured to provide navigation instructions corresponding to the selected destination, as shown in FIG. 5F.

Figure 5G:
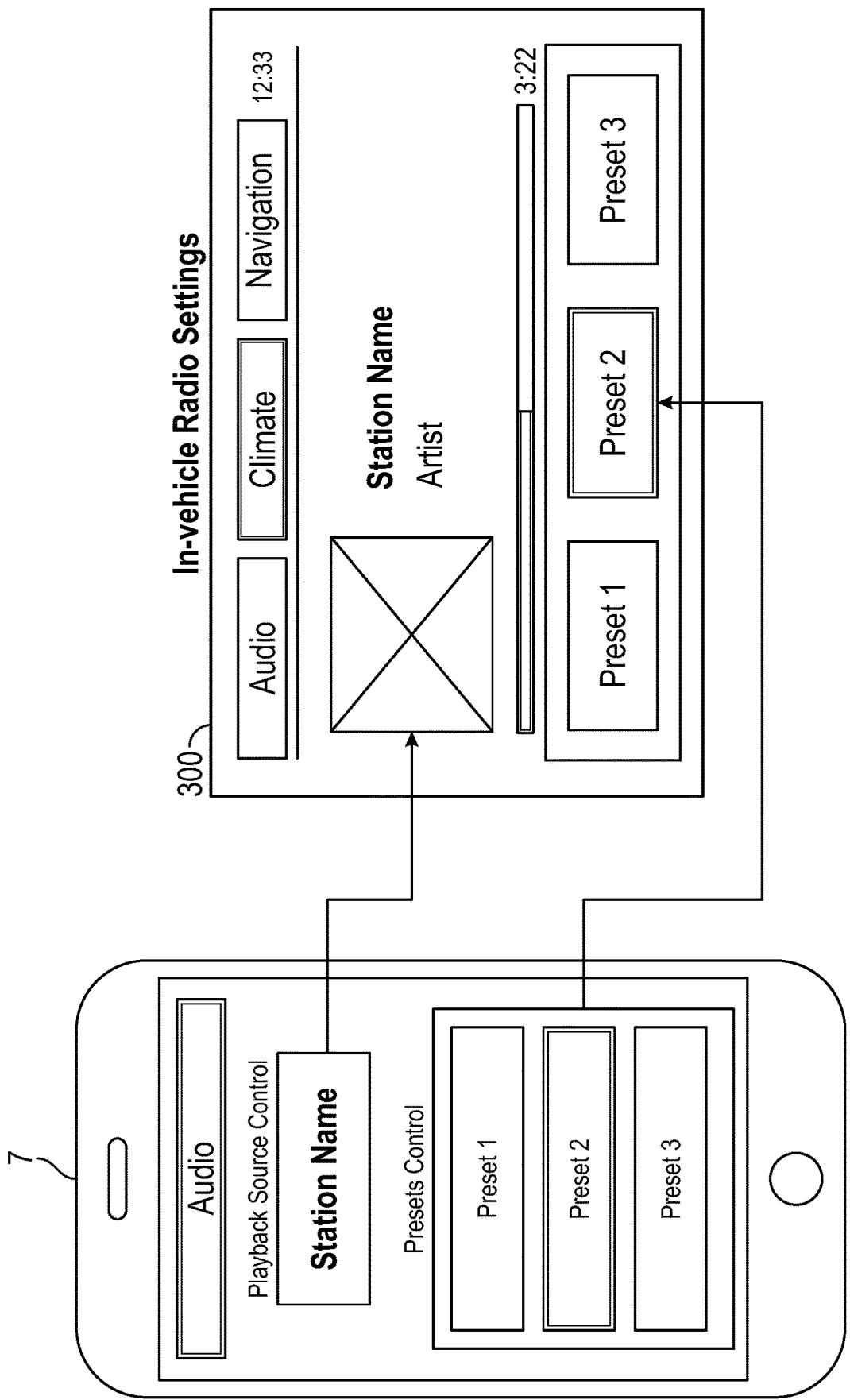

Additionally, the DPM 130 may instruct the audio control module 200 to adjust various audio settings of the vehicle 5 based on the user's vehicle-sharing account. The audio settings may be defined by the user 20 via an application executing on the portable device 10, as shown in screenshot 7 in FIG. 5G. Additionally, the audio settings may be defined by the user 20 via the display 300, as shown in FIG. 5G. In other embodiments, the audio settings may be defined by the fleet manager computing system 230 using a machine learning algorithm that utilizes audio settings of prior vehicle-sharing sessions associated with the user 20 to predict the user's desired audio settings.

As an example, the DPM 130 may instruct the audio control module 200 to adjust a volume level of a radio system 320 based on a designated volume level indicated by the vehicle-sharing account associated with the user 20. Additionally, the DPM 130 may instruct the audio control module 200 to pair the portable device 10 and the vehicle 5 via Bluetooth module 330 in order to enable the user 20 to execute hands-free voice calling functions and play music stored on the portable device 10.

As another example, the DPM 130 may instruct the audio control module 200 to adjust the display 300 such that it corresponds to radio settings indicated by the vehicle-sharing account associated with the user 20. More specifically, the audio control module 200 may adjust the display 300 such that a plurality of GUI elements associated with preselected radio stations (e.g., radio presets) are displayed on the display 300, as shown in FIG. 5G. The preselected radio stations may be based on particular radio stations or types of radio stations (e.g., music genres, news radio stations, sports radio stations, etc.) indicated by the user 20 via the user's vehicle-sharing account. Additionally, the preselected radio stations may be based on location information obtained from a global navigation satellite system (GNSS) sensor 340. More specifically, if the user's vehicle-sharing account indicates that the user 20 prefers country music and the user 20 is at a new location, the audio control module 200 may adjust the display 300 such that each of the GUI elements are associated with country radio stations at the new location. In other embodiments, the DPM 130 may instruct the audio control module 200 to adjust the display 300 such that it corresponds to radio settings associated with a previous vehicle-sharing session associated with the user 20.

Figure 6:
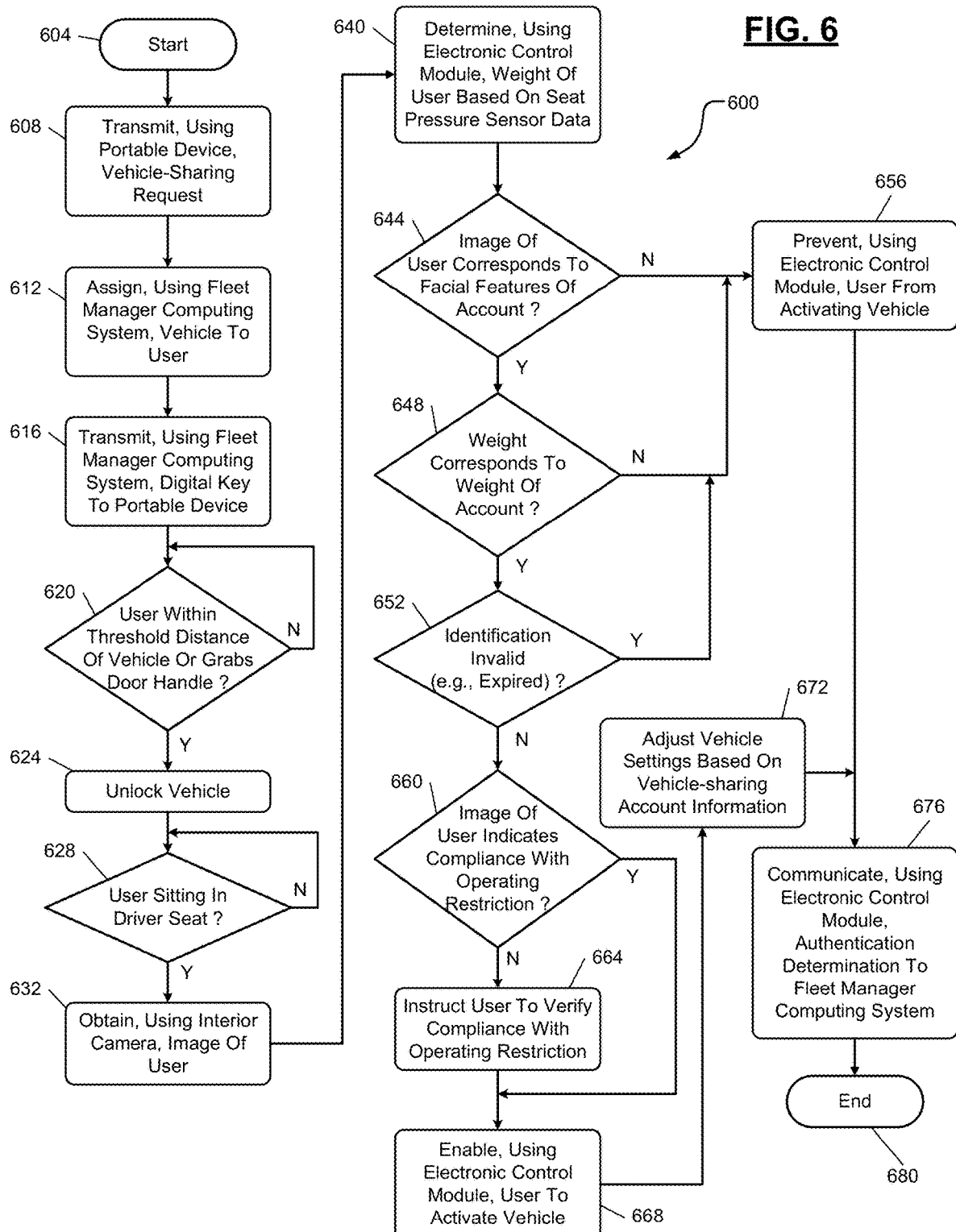

With reference to FIG. 6, a flowchart illustrating a control algorithm 600 for authenticating the user 20 is shown. The control algorithm 600 begins at 604 when, for example, the portable device 10 is turned on. At 608, the control algorithm 600 transmits, using the portable device 10, a vehicle-sharing request to the fleet manager computing system 230. At 612, the control algorithm 600 assigns, using the fleet manager computing system 230, the vehicle 5 to the user 20. At 616, the control algorithm 600 transmits, using the fleet manager computing system 230, a digital key to the portable device 10. The digital key is configured to enable the user 20 to enter the vehicle 5. At 620, the control algorithm 600 determines whether the user 20 is within a threshold distance of the vehicle 5 or has grabbed a door handle of the vehicle 5. If so, the control algorithm 600 proceeds to 624; otherwise, the control algorithm 600 remains at 620.

At 624, the control algorithm 600 unlocks the vehicle 5. At 628, the control algorithm 600 determines, using the ECM 50, whether the user 20 is sitting in the driver seat 240. As an example, the ECM 50 may determine the user 20 is sitting in the driver seat 240 based on pressure data obtained from the seat pressure sensor 250. Additionally or alternatively, the control algorithm 600 may determine whether the user 20 has logged into his or her vehicle-sharing account via the display 300 at 628. If the user 20 is sitting in the driver seat 240, the control algorithm 600 proceeds to 632; otherwise, the control algorithm 600 remains at 628. At 632, the control algorithm 600 obtains, using the interior camera 40, an image of the user 20. At 640, the control algorithm 600 determines, using the ECM 50, the weight of the user 20 based on the data obtained by the seat pressure sensor 250.

At 644, the control algorithm 600 determines, using the DAM 120, whether the image of the user corresponds to the facial features associated with the user's vehicle-sharing account. As an example, the DAM 120 may determine a matching score based on the facial features of the obtained image and the facial features associated with the user's vehicle-sharing account, and if the matching score is above a threshold value, the DAM 120 may indicate that the image of the user corresponds to facial features associated with the user's vehicle-sharing account. If the image of the user corresponds to the facial features associated with the user's vehicle-sharing account, the control algorithm 600 proceeds to 648; otherwise, the control algorithm 600 proceeds to 656.

At 648, the control algorithm 600 determines, using the DAM 120, whether the weight indicated by the pressure sensor data corresponds to the weight associated with the user's vehicle-sharing account. As an example, the DAM 120 may determine that the weight indicated by the pressure sensor data corresponds to the weight associated with the user's vehicle-sharing account if the weight indicated by the pressure sensor data has a margin of error that is less than a predetermined threshold margin of error (e.g., 5%). If the weight indicated by the pressure sensor data corresponds to the weight associated with the user's vehicle-sharing account, the control algorithm 600 proceeds to 652; otherwise, the control algorithm 600 proceeds to 656.

At 652, the control algorithm 600 determines, using the DAM 120, whether the user identification card 220 is valid (i.e., determines whether the driving license is expired based on the license expiration date). If so, the control algorithm 600 proceeds to 656; otherwise, the control algorithm 600 proceeds to 660. At 656, the control algorithm 600 prevents, using the ECM 50, the user 20 from activating the vehicle 5 and then proceeds to 676.

At 660, the control algorithm 600 determines, using the DAM 120, whether the image of the user 20 indicates that the user 20 is compliant with any potential operating restrictions indicated by the vehicle-sharing account. As an example, if the vehicle-sharing account associated with the user 20 indicates a corrective lens restriction, the DAM 120 may determine whether the obtained image indicates that the user 20 is wearing prescription eyeglasses. If the image of the user indicates compliance with any potential operating restrictions, the control algorithm 600 proceeds to 668; otherwise, the control algorithm 600 proceeds to 664. At 664, the control algorithm 600 instructs, using the display 300, the user 20 to verify compliance with the operating restriction (e.g., instruct the user 20 to wear prescription eyeglasses or to verify that the user 20 is wearing contact lenses). At 668, the control algorithm 600 enables the user 20 to activate the vehicle 5. At 672, the control algorithm 600 adjusts, using the DPM 130, the vehicle settings based on the vehicle-sharing account information, as described above with reference to FIGS. 5A-5G. At 676, the control algorithm 600 communicates, using the ECM 50, the authentication determination to the fleet manager computing system 230 for subsequent post-processing and then ends at 680.

With reference to FIG. 7, a flowchart illustrating a control algorithm 700 performing the driver personalization algorithm is shown. The control algorithm 700 begins at 704 when, for example, the portable device 10 is turned on. At 708, the control algorithm 700 determines, using the ECM 50, whether the user 20 is authenticated. If so, the control algorithm 700 proceeds to 712; otherwise, the control algorithm 700 proceeds to 732. At 712, the control algorithm 700 establishes, using the Bluetooth module 330, a communication link between the portable device 10 and the vehicle 5. At 716, the control algorithm 700 adjusts, using the ECM 50, the position of the driver seat 240, the position of the mirrors 280, the position of the steering wheel 270, and the position of the pedals 290 based on the height of the user 20 indicated by the vehicle-sharing account. At 720, the control algorithm 700 adjusts, using the ECM 50, the audio settings and the display 300 based on audio information indicated by the vehicle-sharing account and/or based on the location of the user 20 or the vehicle 5. At 724, the control algorithm 700 adjusts, using the ECM 50, the climate settings based on climate settings indicated by the vehicle-sharing account. At 728, the control algorithm 700 adjusts, using the ECM 50, the navigation interface of the display 300 based on navigation settings indicated by the vehicle-sharing account. At 732, the control algorithm 700 ends.

The present disclosure provides a method that includes determining, using a processor configured to execute instructions stored in a nontransitory computer-readable medium, whether a user is authenticated to operate a vehicle-sharing vehicle. The method further includes, in response to determining the user is authenticated, obtaining, using the processor, a height value, wherein the height value is associated with a vehicle-sharing account of the user and is displayed on an identification card of the user, determining, using the processor, whether a position of a vehicle control mechanism needs to be adjusted based on the height value, and, in response to determining that the position of the vehicle control mechanism needs to be adjusted, adjusting, using the processor, the position of the vehicle control mechanism based on the height value.

In other features, the vehicle control mechanism includes at least one of a steering wheel, an accelerator pedal, a brake pedal, a driver seat, and a mirror.

The present disclosure also provides a method that includes determining, using a processor configured to execute instructions stored in a nontransitory computer-readable medium, whether a user is authenticated to operate a vehicle-sharing vehicle. The method includes, in response to determining the user is authenticated, obtaining, using the processor, audio settings associated with the vehicle-sharing account, and displaying, using a display device of the vehicle, graphical user interface elements based on the audio settings, wherein each of the graphical user interface elements is associated with a radio station.

In other features, the method further includes adjusting, using the processor, a volume of a radio system based on the audio settings.

In other features, the method further includes adjusting the graphical user interface elements based on a location of the vehicle.

In other features, each of the graphical user interface elements is associated with a preselected radio station designated by the user.

The present disclosure also provides a method that includes determining, using a processor configured to execute instructions stored in a nontransitory computer-readable medium, whether a user is authenticated to operate a vehicle-sharing vehicle. The method further includes, in response to determining the user is authenticated, obtaining, using the processor, climate settings associated with the vehicle-sharing account, and adjusting, using the processor, at least one of (i) a temperature of a climate control system based on the climate settings, and (ii) a fan speed of a climate control system based on the climate settings.

The present disclosure also provides a method that includes determining, using a processor configured to execute instructions stored in a nontransitory computer-readable medium, whether a user is authenticated to operate a vehicle-sharing vehicle. The method further includes, in response to determining the user is authenticated, obtaining, using the processor, navigation settings associated with the vehicle-sharing account, and displaying, using a display device of the vehicle, graphical user interface elements based on the navigation settings, wherein each of the graphical user interface elements is associated with a destination.

In other features, a first graphical user element is associated with a home location of the user, and a second graphical user element is associated with a desired destination.

The present disclosure also provides a method that includes determining, using a processor configured to execute instructions stored in a nontransitory computer-readable medium, whether a user is authenticated to operate a vehicle-sharing vehicle. The method further includes, in response to determining the user is authenticated, establishing a Bluetooth communication link between a portable device of the user and the vehicle.

The present disclosure also provides a system that includes a processor configured to execute instructions stored in a nontransitory computer-readable medium. The instructions include determining whether a user is authenticated to operate a vehicle-sharing vehicle, and, in response to determining the user is authenticated, obtaining a height value, wherein the height value is associated with a vehicle-sharing account of the user and is displayed on an identification card of the user, determining whether a position of a vehicle control mechanism needs to be adjusted based on the height value, and, in response to determining that the position of the vehicle control mechanism needs to be adjusted, adjusting the position of the vehicle control mechanism based on the height value.

In other features, the vehicle control mechanism includes at least one of a steering wheel, an accelerator pedal, a brake pedal, a driver seat, and a mirror.

The present disclosure also provides a system that includes a processor configured to execute instructions stored in a nontransitory computer-readable medium. The instructions include determining whether a user is authenticated to operate a vehicle-sharing vehicle, and, in response to determining the user is authenticated, obtaining audio settings associated with the vehicle-sharing account, and displaying graphical user interface elements based on the audio settings, wherein each of the graphical user interface elements is associated with a radio station.

In other features, the instructions further comprise adjusting a volume of a radio system based on the audio settings.

In other features, the instructions further include adjusting the graphical user interface elements based on a location of the vehicle.

In other features, each of the graphical user interface elements is associated with a preselected radio station designated by the user.

The present disclosure also provides a system that includes a processor configured to execute instructions stored in a nontransitory computer-readable medium. The instructions include determining whether a user is authenticated to operate a vehicle-sharing vehicle, and, in response to determining the user is authenticated, obtaining climate settings associated with the vehicle-sharing account, and adjusting at least one of (i) a temperature of a climate control system based on the climate settings, and (ii) a fan speed of a climate control system based on the climate settings.

The present disclosure also provides a system that includes a processor configured to execute instructions stored in a nontransitory computer-readable medium. The instructions include determining whether a user is authenticated to operate a vehicle-sharing vehicle, and, in response to determining the user is authenticated, obtaining navigation settings associated with the vehicle-sharing account, and displaying graphical user interface elements based on the navigation settings, wherein each of the graphical user interface elements is associated with a destination.

In other features, a first graphical user element is associated with a home location of the user, and a second graphical user element is associated with a desired destination.

The present disclosure also provides a system that includes a processor configured to execute instructions stored in a nontransitory computer-readable medium. The instructions include determining whether a user is authenticated to operate a vehicle-sharing vehicle, and, in response to determining the user is authenticated, establishing a Bluetooth communication link between a portable device of the user and the vehicle.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method comprising:

receiving, with at least one processor configured to execute instructions stored in a nontransitory computer-readable medium, information of a vehicle-sharing account associated with a user that submitted a vehicle-sharing request to a vehicle-sharing service, the information of the vehicle-sharing account including (i) an image of the user extracted from an image of a user identification card associated with the user that was previously captured using a camera of a portable device of the user and submitted to the vehicle-sharing service while creating the vehicle-sharing account and (ii) a height of the user extracted from the image of the user identification card;

obtaining, with the at least one processor, image data of the user sitting in a driver seat of the vehicle from a camera within the vehicle;

determining, with the at least one processor, whether the image data obtained by the camera within the vehicle matches the image of the user extracted from the image of the user identification card associated with the user from the received information of the vehicle-sharing account of the user;

authenticating, with the at least one processor, the user in response to determining that the image data obtained by the camera matches the image of the user extracted from the image of the user identification card;

in response to the user being authenticated:
  determining, using the at least one processor, whether a position of a vehicle control mechanism needs to be adjusted based on the height of the user; and
  in response to determining that the position of the vehicle control mechanism needs to be adjusted, adjusting, using the at least one processor, the position of the vehicle control mechanism based on the height of the user.

2. The method of claim 1, wherein the vehicle control mechanism includes at least one of a steering wheel, an accelerator pedal, a brake pedal, a driver seat, and a mirror.

3. A method comprising:
  receiving, with at least one processor configured to execute instructions stored in a nontransitory computer-readable medium, information of a vehicle-sharing account associated with a user that submitted a vehicle-sharing request to a vehicle-sharing service, the information of the vehicle-sharing account including an image of the user extracted from an image of a user identification card associated with the user that was previously captured using a camera of a portable device of the user and submitted to the vehicle-sharing service while creating the vehicle-sharing account;
  obtaining, with the at least one processor, image data of the user sitting in a driver seat of the vehicle from a camera within the vehicle;
  determining, with the at least one processor, whether the image data obtained by the camera within the vehicle matches the image of the user extracted from the image of the user identification card associated with the user from the received information of the vehicle-sharing account of the user;
  authenticating, with the at least one processor, the user in response to determining that the image data obtained by the camera matches the image of the user extracted from the image of the user identification card; and
  in response to the user being authenticated:
    obtaining, using the at least one processor, audio settings associated with the vehicle-sharing account; and
    displaying, using a display device of the vehicle, graphical user interface elements based on the audio settings, wherein each of the graphical user interface elements is associated with a radio station.

4. The method of claim 3, further comprising adjusting, using the at least one processor, a volume of a radio system based on the audio settings.

5. The method of claim 3, further comprising adjusting the graphical user interface elements based on a location of the vehicle.

6. The method of claim 3, wherein each of the graphical user interface elements is associated with a preselected radio station designated by the user.

7. A method comprising:
  receiving, with at least one processor configured to execute instructions stored in a nontransitory computer-readable medium, information of a vehicle-sharing account associated with a user that submitted a vehicle-sharing request to a vehicle-sharing service, the information of the vehicle-sharing account including an image of the user extracted from an image of a user identification card associated with the user that was previously captured using a camera of a portable device of the user and submitted to the vehicle-sharing service while creating the vehicle-sharing account;
  obtaining, with the at least one processor, image data of the user sitting in a driver seat of the vehicle from a camera within the vehicle;
  determining, with the at least one processor, whether the image data obtained by the camera within the vehicle matches the image of the user extracted from the image of the user identification card associated with the user from the received information of the vehicle-sharing account of the user;
  authenticating, with the at least one processor, the user in response to determining that the image data obtained by the camera matches the image of the user extracted from the image of the user identification card;
  in response to the user being authenticated:
    obtaining, using the at least one processor, climate settings associated with the vehicle-sharing account; and
    adjusting, using the at least one processor, at least one of (i) a temperature of a climate control system based on the climate settings, and (ii) a fan speed of a climate control system based on the climate settings.

8. A method comprising:
  receiving, with at least one processor configured to execute instructions stored in a nontransitory computer-readable medium, information of a vehicle-sharing account associated with a user that submitted a vehicle-sharing request to a vehicle-sharing service, the information of the vehicle-sharing account including an image of the user extracted from an image of a user identification card associated with the user that was previously captured using a camera of a portable device of the user and submitted to the vehicle-sharing service while creating the vehicle-sharing account;
  obtaining, with the at least one processor, image data of the user sitting in a driver seat of the vehicle from a camera within the vehicle;
  determining, with the at least one processor, whether the image data obtained by the camera within the vehicle matches the image of the user extracted from the image of the user identification card associated with the user from the received information of the vehicle-sharing account of the user;
  authenticating, with the at least one processor, the user in response to determining that the image data obtained by the camera matches the image of the user extracted from the image of the user identification card;
  in response to the user being authenticated:
    obtaining, using the at least one processor, navigation settings associated with the vehicle-sharing account; and
    displaying, using a display device of the vehicle, graphical user interface elements based on the navigation settings, wherein each of the graphical user interface elements is associated with a destination.

9. The method of claim 8, wherein:
  a first graphical user element is associated with a home location of the user; and
  a second graphical user element is associated with a desired destination.

10. A method comprising:
  receiving, with at least one processor configured to execute instructions stored in a nontransitory computer-readable medium, information of a vehicle-sharing account associated with a user that submitted a vehicle-sharing request to a vehicle-sharing service, the information of the vehicle-sharing account including an image of the user extracted from an image of a user identification card associated with the user that was previously captured using a camera of a portable device of the user and submitted to the vehicle-sharing service while creating the vehicle-sharing account;

obtaining, with the at least one processor, image data of the user sitting in a driver seat of the vehicle from a camera within the vehicle;

determining, with the at least one processor, whether the image data obtained by the camera within the vehicle matches the image of the user extracted from the image of the user identification card associated with the user from the received information of the vehicle-sharing account of the user;

authenticating, with the at least one processor, the user in response to determining that the image data obtained by the camera matches the image of the user extracted from the image of the user identification card;

in response to the user being authenticated, establishing a Bluetooth communication link between a portable device of the user and the vehicle.

11. A system comprising:

a processor configured to execute instructions stored in a nontransitory computer-readable medium, wherein the instructions include:

receiving information of a vehicle-sharing account associated with a user that submitted a vehicle-sharing request to a vehicle-sharing service, the information of the vehicle-sharing account including (i) an image of the user extracted from an image of a user identification card associated with the user that was previously captured using a camera of a portable device of the user and submitted to the vehicle-sharing service while creating the vehicle-sharing account and (ii) a height of the user extracted from the image of the user identification card;

obtaining image data of the user sitting in a driver seat of the vehicle from a camera within the vehicle;

determining whether the image data obtained by the camera within the vehicle matches the image of the user extracted from the image of the user identification card associated with the user from the received information of the vehicle-sharing account of the user;

authenticating the user in response to determining that the image data obtained by the camera matches the image of the user extracted from the image of the user identification card; and in response to the user being authenticated:
determining whether a position of a vehicle control mechanism needs to be adjusted based on the height of the user; and
in response to determining that the position of the vehicle control mechanism needs to be adjusted, adjusting the position of the vehicle control mechanism based on the height of the user.

12. The system of claim 11, wherein the vehicle control mechanism includes at least one of a steering wheel, an accelerator pedal, a brake pedal, a driver seat, and a mirror.

13. A system comprising:

a processor configured to execute instructions stored in a nontransitory computer-readable medium, wherein the instructions include:

receiving information of a vehicle-sharing account associated with a user that submitted a vehicle-sharing request to a vehicle-sharing service, the information of the vehicle-sharing account including an image of the user extracted from an image of a user identification card associated with the user that was previously captured using a camera of a portable device of the user and submitted to the vehicle-sharing service while creating the vehicle-sharing account;

obtaining image data of the user sitting in a driver seat of the vehicle from a camera within the vehicle;

determining whether the image data obtained by the camera within the vehicle matches the image of the user extracted from the image of the user identification card associated with the user from the received information of the vehicle-sharing account of the user;

authenticating the user in response to determining that the image data obtained by the camera matches the image of the user extracted from the image of the user identification card; and in response to the user being authenticated:
obtaining audio settings associated with the vehicle-sharing account; and
displaying graphical user interface elements based on the audio settings, wherein each of the graphical user interface elements is associated with a radio station.

14. The system of claim 13, wherein the instructions further comprise adjusting a volume of a radio system based on the audio settings.

15. The system of claim 13, wherein the instructions further comprise adjusting the graphical user interface elements based on a location of the vehicle.

16. The system of claim 13, wherein each of the graphical user interface elements is associated with a preselected radio station designated by the user.

17. A system comprising:

a processor configured to execute instructions stored in a nontransitory computer-readable medium, wherein the instructions include:

receiving information of a vehicle-sharing account associated with a user that submitted a vehicle-sharing request to a vehicle-sharing service, the information of the vehicle-sharing account including an image of the user extracted from an image of a user identification card associated with the user that was previously captured using a camera of a portable device of the user and submitted to the vehicle-sharing service while creating the vehicle-sharing account;

obtaining image data of the user sitting in a driver seat of the vehicle from a camera within the vehicle;

determining whether the image data obtained by the camera within the vehicle matches the image of the user extracted from the image of the user identification card associated with the user from the received information of the vehicle-sharing account of the user;

authenticating the user in response to determining that the image data obtained by the camera matches the image of the user extracted from the image of the user identification card; and in response to the user being authenticated:
obtaining climate settings associated with the vehicle-sharing account; and
adjusting at least one of (i) a temperature of a climate control system based on the climate settings, and (ii) a fan speed of a climate control system based on the climate settings.

18. A system comprising:
a processor configured to execute instructions stored in a nontransitory computer-readable medium, wherein the instructions include:
　　receiving information of a vehicle-sharing account associated with a user that submitted a vehicle-sharing request to a vehicle-sharing service, the information of the vehicle-sharing account including an image of the user extracted from an image of a user identification card associated with the user that was previously captured using a camera of a portable device of the user and submitted to the vehicle-sharing service while creating the vehicle-sharing account;
　　obtaining image data of the user sitting in a driver seat of the vehicle from a camera within the vehicle;
　　determining whether the image data obtained by the camera within the vehicle matches the image of the user extracted from the image of the user identification card associated with the user from the received information of the vehicle-sharing account of the user;
　　authenticating the user in response to determining that the image data obtained by the camera matches the image of the user extracted from the image of the user identification card; and
　　in response to the user being authenticated:
　　　　obtaining navigation settings associated with the vehicle-sharing account; and
　　　　displaying graphical user interface elements based on the navigation settings, wherein each of the graphical user interface elements is associated with a destination.

19. The system of claim 18, wherein:
a first graphical user element is associated with a home location of the user; and
a second graphical user element is associated with a desired destination.

20. A system comprising:
a processor configured to execute instructions stored in a nontransitory computer-readable medium, wherein the instructions include:
receiving information of a vehicle-sharing account associated with a user that submitted a vehicle-sharing request to a vehicle-sharing service, the information of the vehicle-sharing account including an image of the user extracted from an image of a user identification card associated with the user that was previously captured using a camera of a portable device of the user and submitted to the vehicle-sharing service while creating the vehicle-sharing account;
obtaining image data of the user sitting in a driver seat of the vehicle from a camera within the vehicle;
determining whether the image data obtained by the camera within the vehicle matches the image of the user extracted from the image of the user identification card associated with the user from the received information of the vehicle-sharing account of the user;
authenticating the user in response to determining that the image data obtained by the camera matches the image of the user extracted from the image of the user identification card; and
in response to the user being authenticated, establishing a Bluetooth communication link between a portable device of the user and the vehicle.

* * * * *